US012103779B2

(12) United States Patent
Langenbach et al.

(10) Patent No.: US 12,103,779 B2
(45) Date of Patent: Oct. 1, 2024

(54) SYSTEM AND METHOD FOR PICKING FLATPACK ARTICLES

(71) Applicant: SSI Schäfer Automation GmbH (DE), Giebelstadt (DE)

(72) Inventors: Tim Langenbach, Holzwickede (DE); Markus Schellinger, Würzburg (DE)

(73) Assignee: SSI Schäfer Automation GmbH (DE), Giebelstadt (DE)

( * ) Notice: Subject to any disclaimer, the term of this patent is extended or adjusted under 35 U.S.C. 154(b) by 0 days.

(21) Appl. No.: 18/571,823

(22) PCT Filed: Apr. 27, 2022

(86) PCT No.: PCT/EP2022/061270
§ 371 (c)(1),
(2) Date: Dec. 19, 2023

(87) PCT Pub. No.: WO2022/268381
PCT Pub. Date: Dec. 29, 2022

(65) Prior Publication Data
US 2024/0262628 A1    Aug. 8, 2024

(30) Foreign Application Priority Data

Jun. 25, 2021  (DE) .................. 10 2021 116 485.0

(51) Int. Cl.
*G06F 7/00* (2006.01)
*B65G 1/04* (2006.01)
(Continued)

(52) U.S. Cl.
CPC ......... *B65G 1/1378* (2013.01); *B65G 1/0407* (2013.01); *B65G 61/00* (2013.01)

(58) Field of Classification Search
CPC ..... B65G 1/1378; B65G 1/0407; B65G 61/00
(Continued)

(56) References Cited

U.S. PATENT DOCUMENTS

2004/0193311 A1   9/2004  Winkler
2007/0005181 A1*  1/2007  Stingel, III .......... B65G 1/1378
                                                        700/216
(Continued)

FOREIGN PATENT DOCUMENTS

DE    29818293 U1   10/1999
DE    10119679 A1   10/2002
EP     1462393 B1    8/2006

OTHER PUBLICATIONS

English Translation of International Preliminary Report on Patentability for International Application No. PCT/EP2022/061270, mailed Nov. 27, 2023.
(Continued)

*Primary Examiner* — Yolanda R Cumbess
(74) *Attorney, Agent, or Firm* — Jason H. Vick; Womble Bond Dickinson (US) LLP (57) ABSTRACT

There are disclosed method and system (10) for picking of articles (12), in particular flat-pack articles (12), in accordance with picking orders, wherein the system (10) comprises: a rack (24) extending substantially along longitudinal and height directions (X, Y) of the system (10) and comprising a plurality of storage locations (30) configured to store source pallets (30); a gantry robot (36) including a manipulation unit (37) configured to transfer the articles (16); a packing position (62) configured to buffer a target pallet (34); a plurality of conveyors (38); and a control (74), which is preferably configured to determine, for each of the orders, an order-specific packing pattern for automatically packing, by the gantry robot (36), several of the articles (12) in accordance with the respective order from one or more of the source pallets (30) on a target pallet (34) in the packing position (62); wherein each of the conveyors (38) comprises a receiving position (66), which is positioned within the rack (24) and configured to receive the source pallets (30), as well (Continued)

as a delivering position (58), which is positioned within an action space of the gantry robot (36) and configured to provide, preferably dynamically, the source pallets (30); wherein the gantry robot (36) defines the action space, within which the manipulation unit (37) is movable and which contains the packing position (62) and the delivering positions (58) the conveyor (38); and wherein the control (74) is further configured to cause that such of the source pallets (30) are transported from the storage locations (32) via the receiving positions (66) to the delivering positions (58), which include the articles (12) required for the packing in accordance with the respective packing pattern.

21 Claims, 8 Drawing Sheets

(51) Int. Cl.
*B65G 1/137* (2006.01)
*B65G 61/00* (2006.01)

(58) Field of Classification Search
USPC .......................................... 700/216–217, 228
See application file for complete search history.

(56) References Cited

U.S. PATENT DOCUMENTS

| 2010/0158647 | A1* | 6/2010 | Lafontaine | ........... B65G 1/1378 414/807 |
| 2018/0178992 | A1 | 6/2018 | Gondoh et al. | |

OTHER PUBLICATIONS

International Search Report (Including Translation) for International Applicaton No. PCT/EP2022/061270, mailed Sep. 14, 2022.
Written Opinion for International Application No. PCT/EP2022/061270, mailed Sep. 14, 2022.
International Preliminary Report on Patentability for International Application No. PCT/EP2022/061270, mailed Nov. 27, 2023.

* cited by examiner

SYSTEM AND METHOD FOR PICKING FLATPACK ARTICLES

CROSS-REFERENCE TO RELATED APPLICATIONS

This application is a national stage application under 35 U.S.C. 371 of PCT Application No. PCT/EP2022/061270, having an international filing date of 27 Apr. 2022, which designated the United States, which PCT application claimed the benefit of German Patent Application No. 10 2021 116 485.0, filed 25 Jun. 2021, each of which are incorporated herein by reference in their entirety.

BACKGROUND

The present disclosure generally relates to intralogistics system and method for automatically picking articles, in particular flat-pack articles. Preferably, the picking is performed in a fully automatic manner. Picking sources and targets are represented by pallet-like load carriers.

Many different automatic picking systems exist which are used for different purposes and boundary conditions.

EP 1 462 393 B1 describes a fully automatic system separating articles from single article incoming-goods pallets onto individual trays so that always only one article sits on each tray. The incoming-goods pallets are stored in a high-bay warehouse and are depalletized for creating a picking buffer (tray warehouse). Articles required for processing a picking order are retrieved, while sitting on the trays, from the tray warehouse and are separated from the tray briefly in front of a packing machine, after sequencing. The packing machine transfers the articles onto a target pallet in accordance with a predetermined packing pattern. In particular, the system of EP 1 462 393 B1 is used by grocery-chain stores. This means that the described system is used in distribution centers where target pallets are typically assembled for a branch of a food retailer. Direct picking of the articles from the storage pallets onto the target pallets is not considered, in particular because the storage machines within the high-bay warehouse cannot perform a sufficient number of change cycles.

Further, picking systems in the beverage wholesale sector are known where gantry robots are used for fully automatic picking of beverage boxes. Such a system is shown in the YouTube video "Bau-Projektverlauf Automatisiertes Handelslager Getränke" (www.youtube.com/watch?v=3OvSIMfit3k). Also in this system the articles are separated in advance from source pallets and stacked to form towers. One individual tray warehouse is also used. The source pallets are depalletized in layers, or rows, by means of an additional gantry robot for being fed to the picking gantry robot one by one by means of formation of intervals on a roller conveyor. Subsequently, the picking gantry robot stacks the individual articles again and puts the stacks onto the target pallet. The throughput (picked articles/unit of time) is low. Direct picking of articles (beverage boxes) from the source pallets onto the target pallets is not possible.

Further, the above-discussed systems basically are not suitable for picking flat-pack articles.

The document DE 298 18 293 U1 discloses bottle-handling device for storing and palletizing empty PET bottles.

Therefore, it is an object to provide improved system and method for picking articles, in particular flat-pack articles.

This object is solved by a system for picking articles in accordance with picking orders, wherein the system comprises: a rack extending substantially along longitudinal and height directions of the system and comprising a plurality of storage locations being configured to store source pallets; a gantry robot including a manipulation unit configured to transfer the articles; a packing position configured to buffer a target pallet; a plurality of conveyors, preferably aligned parallel to a transverse direction of the system; and a control preferably configured to determine, for each of the orders, an order-specific packing pattern for automatically stacking or packing, by the gantry robot, several of the articles in accordance with the respective order from one or more of the source pallets automatically on the target pallet in the packing position; wherein each of the conveyors comprises a receiving position, which is positioned within the rack and configured to receive the source pallets, as well as a delivering position, which is positioned within an action space of the gantry robot and configured to provide, preferably dynamically, the source pallets; wherein the gantry robot defines the action space, within which the manipulation unit is movable and which contains the packing position and the delivering positions of the conveyors; and wherein the control is further configured to cause that such of the source pallets are transported from the storage locations via the receiving position to the delivering positions, which include the articles required for the stacking, or packing, in accordance with the respective packing pattern.

The gantry robot is supplied directly from the rack with such source pallets which are required by the gantry robot for the picking. The transport paths are short. The transport times are short. The picking performance is high. The picking of required individual parts is performed directly from the source pallet. The system is fully automatic so that even heavy and bulky articles can be picked.

The source pallets are "tunneled" through the rack by means of the conveyors. The source pallets are brought to the picking zone on direct and short path.

The area requirement is small. There is no need for a complex branched conveyor network between the storage area and the picking area. The depalletizing and palletizing takes place at the same location, i.e. no conveyor network is required between the depalletizing and palletizing either.

There is no need for an additional picking warehouse, which is fed with individual articles from the pallet warehouse. Nevertheless, a concept of piece picking, or of case picking, can be applied where pallets are the (only) sources for the picking.

The system is particularly suitable for picking flat-pack articles. Flat-pack articles are flat, huge, and heavy, and thus are not suitable for a concept of picking which works with a picking buffer between the pallet warehouse and the picking zone. The picking of flat-pack articles is conducted fully automatic so that the ergonomic challenges are eliminated, which can arise from the use of people when picking is conducted manually.

The present concept of picking is particularly suitable for e-commerce applications in the furniture industry. The pieces of furniture are stored in terms of individual parts as "flat packs" on source pallets (in a single-variety, single-type, or single-article manner) and are picked in accordance with concepts known from the classic container picking (goods to person). E-commerce is characterized by the fact that many customers place orders that respectively comprise only a few order lines each. This means that the system is confronted with a very large number of small (few different articles, in particular in small quantities; i.e. few order lines per order) orders, which is actually an argument against picking directly from a source pallet.

Furthermore, existing systems can be converted, or retrofitted, with simple measures. The conveyors can be installed, in particular at the lowest level, in existing racks without much effort. Then, the gantry robot(s) can be placed directly to the side of the rack. The supply of the picking cells, which are defined by the gantry robot, with target pallets can take place, for example, by discontinuous conveyors, such as transfer carriages, positively guided or autonomously driven driverless transport vehicles, and the like, which can then transport the completed target pallets to a shipping zone.

A rack including at least two rack levels is already sufficient for allowing integration of the conveyors into the rack. This means that existing installations, which comprise relatively low pallet warehouses, can be retrofitted.

The material-flow node of each rack, i.e. the front area or the ends of the rack aisles, are relieved, because the material flow caused by the picking take place through the longitudinal side of the rack while the supply of the rack with replenishment, as well as the disposal of emptied load carriers, can continuously occur—as is the classic case—via the end face of the rack or via the ends of the rack aisles.

Preferably, the gantry robot is adjacent, substantially directly, to a longitudinal side of the rack.

The arrangement, substantially without any distance, of the gantry robot relative to the rack shortens the transport paths, and thus the transport times. The picking performance is increased.

Further, the coupling to the longitudinal side is advantageous because a large number of conveyors can be arranged directly next to each other there.

Long transport paths from one of the end faces of the rack to the picking stations, i.e. to the gantry robots, are eliminated. The material-flow bottle neck at the short end faces of the rack is eliminated. More source pallets per unit of time can be retrieved via the longitudinal side than via the end face of the rack because more transfer points are present.

In particular, the conveyors are linear continuous conveyors which can be operated bidirectionally, which are oriented perpendicularly, preferably horizontally perpendicular, to the longitudinal direction, and which comprise the receiving positions and the delivering positions at the respective end portions thereof.

Linear continuous conveyors can be controlled easily. Linear continuous conveyors do not require switches or junctions. They have a high transport performance (number of source pallets/time).

The ability to operate the conveyors bidirectionally opens the possibility to store the source pallets back again on the same way.

The perpendicular orientation of the conveyors relative to the longitudinal direction of the system, along which also the rack extends, increases the density, or number, of the source pallets/section of length, which can be served to the gantry robot. This increases the performance because more target pallets per unit of time can be picked. The gantry robot does not need to wait until the next source pallet is served.

Further, it is advantageous if the system further comprises at least one storage and retrieval device configured to exchange the source pallets automatically between storage locations and the receiving locations, wherein the storage and retrieval device is preferably adjacent to a longitudinal side of the rack facing away from the gantry robot.

The storage and retrieval devices are part of the full automation and allow an automatic transfer of the source pallets in the area of the rack. The receiving locations are within the rack, like the storage locations, and thus can be reached by the storage and retrieval device without any problem.

The storage and retrieval device is preferably used on the longitudinal side of the rack opposite to the gantry robot, so that the conveyors pass transversely for supplying the source pallets to the gantry robot. The storage and retrieval devices and the gantry robots do not disturb each other. The storage and retrieval devices and the gantry robots are spatially separated, but nevertheless directly connected—on shortest way—in terms of material flow.

Preferably, the system comprises further delivering positions which are also positioned within the action space and configured to statically provide additional source pallets.

The static provision of source pallets eliminates storing back of the source pallets. The static provision is particularly suitable for articles of the access frequency A because these articles occur very frequently in picking orders. Thus, the corresponding source pallets are emptied rapidly so that storing back is uneconomical. Dynamically provided source pallets rather belong to the access frequency categories B and C. In this case, it may make sense to store back the corresponding articles.

In particular, at least some, and preferably all, of the further delivering positions are coupled to a supplying conveyor, which is different to the conveyors and preferably includes a transfer carriage.

The supplying conveyor is coupled, in terms of material flow, to the rack, preferably in the face area of the rack where the storage and retrieval devices can deliver source pallets.

The material-flow connection of the dynamically provided source pallets and the statically provided source pallets is separated and implemented by different conveyors. The dynamic provision is preferably implemented by continuous conveyors, whereas the static provision is implemented in particular by discontinuous conveyors.

Preferably, the system further comprises a discharging conveyor, which preferably extends parallel to the longitudinal direction and centrally through the action space.

The discharging conveyor can be used for removing waste, such as intermediate layers, from the action space of the gantry robot, so that the gantry robot can access articles arranged deeper within the source pallet, which would be covered otherwise.

In particular, the conveyors are arranged on a floor level of the system.

Thereby, assembly is simplified. Platform-type frames are eliminated. The conveyors are easily accessible for maintenance technicians.

Preferably, one level of the rack is exclusively provided with the conveyors, wherein preferably several of the gantry robots are arranged in the longitudinal direction directly adjacent to each other, and wherein at least one separate packing station is provided for each of the gantry robots.

The packing robot are not operated in an overlapping manner. This simplifies the control of the gantry robots. The gantry robots can be operated independently from each other, in particular because each gantry robot delivers the articles to a separate packing station.

Further, it is advantageous, if a ratio between a number of the conveyors and a number of the storage locations along the longitudinal direction is 1:2 or 2:3.

Preferably, the gantry robot is configured to depalletize the source pallets within the action space, as well as to palletize the target pallets there.

In particular, each of the articles is rectangularly plate-shaped; in particular has outer dimensions in a range of 620×300×7 mm³ to 2550×800×200 mm³; preferably weighs 62 kg at maximum; and/or preferably contains stacked individual parts of a ready-to-assemble piece of furniture.

The object is further solved by a method for picking articles in accordance with picking orders, comprising the steps of: retrieving source pallets, which store the articles required for packing on a target pallet in accordance with a packing pattern, from storage locations of a rack; delivering the retrieved source pallets to receiving positions of conveyors, wherein the receiving positions are arranged within the rack, wherein the conveyors extend, in particular linear, from the rack to a gantry robot arranged along a longitudinal side of the rack, preferably directly, laterally adjacent to the rack; transporting, by the conveyors, the delivered source pallets from the receiving positions to the corresponding delivering positions of the conveyors, which are positioned within an action space of the gantry robot; and transferring the articles, which are required for the packing in accordance with the packing pattern on the target pallet, by means of a manipulation unit of the gantry robot.

Preferably, the transferring of the articles comprises: receiving the articles from the source pallets at the delivering positions; moving the received articles to a position on the target pallet given by the packing pattern; and packing (by stacking) the received articles on the target pallet in accordance with the respective packing pattern.

In particular, the method further comprises: determining, by a control or a computer, the packing pattern for each order including the source pallets storing the articles, which are required for the packing in accordance with the packing pattern on the target pallet.

It is understood that the above-mentioned and hereinafter still to be explained features cannot be used in the respectively given combination only, but also in other combinations or alone, without departing from the scope of the present invention.

Embodiments of the invention are illustrated in the drawings and will be explained in the following description in more detail.

BRIEF DESCRIPTION OF THE DRAWINGS

FIG. 2 shows a perspective view (FIG. 2A) of a gantry robot and a block diagram (FIG. 2B) of the gantry robot;

FIG. 6 shows a user interface of a planning software (FIG. 6A) and a completely packed target pallet as planned (left side of FIG. 6B) and as actually packed (right side of FIG. 6B)

DETAILED DESCRIPTION

The system 10 proposed here is generally used in intralogistics storage and/or picking environment, such as in a distribution center, in a shipping center, or in a branch of a retailer, in particular of a furniture retailer.

Intralogistics comprises the logistical flow of materials and goods within a company premises, in particular within a company building. The term intralogistics was defined in order to delimit against the transportation of goods outside the company which is carried out, for example, by a freight forwarder. The "Forum Intralogistik" in the "Verband Deutscher Maschinen- and Anlagenbauer" defines the term "intralogistics" as the organization, control, implementation, and optimization of the internal flow of goods and materials, of the flow of information, and the handling of goods in industry, trade, or public institutions.

The term "picking" is to be understood as the compilation of a customer-specific requirement quantity from an assortment of several article types. The picking also describes a picking compilation for a customer order (briefly "order"), i.e. removal of partial quantities of larger units of individual articles and their merging and provision for shipping, or handover within a branch to the customer.

Figure 1:
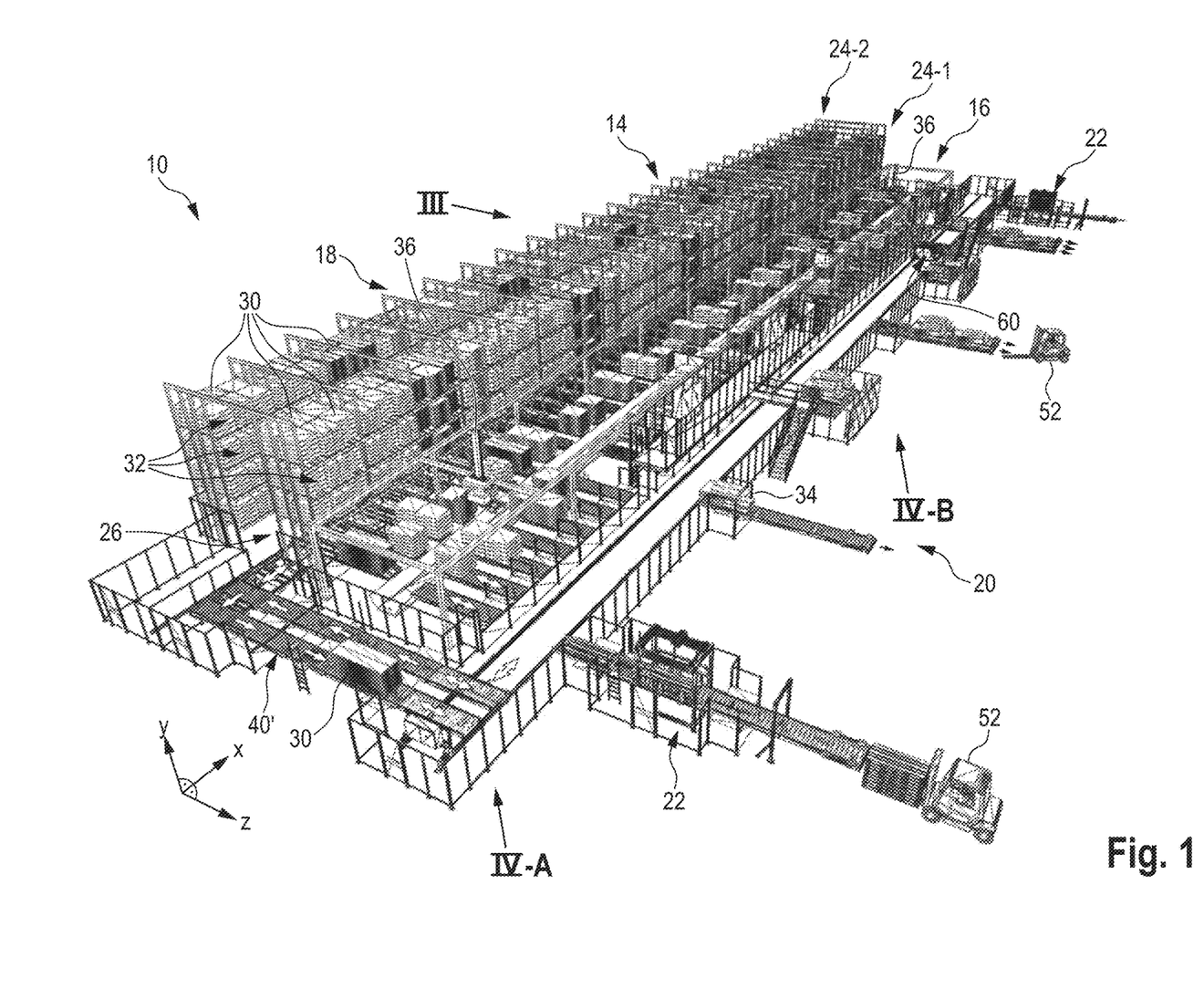
FIG. 1 shows a perspective view of a picking system in accordance with a first embodiment.

FIG. 1 shows a perspective view of a first embodiment of a picking system 10 for (individual) articles 12 (not shown here), which are to be separated from an assortment and to be made ready for issue or dispatch in accordance with customer, or picking, orders. The articles 12 substantially have the shape of a rectangular parallelepiped.

The present development can be used in particular with flat-pack articles representing a specific variant of the above-mentioned parallelepiped-shaped articles 12. The term "flat-pack" designates a plate-like package typically containing a plurality of (flat) ready-to-assemble individual parts, which can be assembled later by the end customer, after unpacking, to form a complex object such as a wardrobe. Flat-pack articles are characterized in that length and width of the package are many times greater than a height of the package. Flat-pack articles are used in particular in the furniture industry. Flat-pack articles are generally heavy, and pose particular ergonomic requirements in handling thereof.

In the following, the present development is generally described on the basis of articles 12 being referred to, in intralogistics, as SKU ("stock keeping unit") or PU (packing units).

The picking system 10, which will hereinafter be referred to briefly also as "system 10", includes a storage zone 14 and a picking zone 16. Further, the system 10 can comprise an incoming-goods zone 18 (covered in FIG. 1 because positioned behind the storage zone 14, cf. also FIG. 3), a shipping zone 20, as well as one or more buffers 22 for empty target pallets 34 (not illustrated).

The storage zone 14 extends substantially parallel to a longitudinal direction X of the system 10. The storage zone 14 of FIG. 1 comprises at least one rack 24, in the present example two racks 24-1 and 24-2, aligned parallel to the longitudinal direction X and defining a rack aisle 26 therebetween, where one or more (here not shown) storage and retrieval devices (SRD) 28 are operated for automatic storing and retrieval of source pallets 30, which preferably are loaded in a type-pure manner. The storage zone 14 of FIG. 1 is operated, for example, by two SRD 28, which are simultaneously operated within the same rack aisle 26. The storage zone 14 is preferably defined by base area of the racks 24 and the rack aisle 26. The term "source pallet 30" is to be understood hereinafter as the unit of the stored articles 12 and the load carrier.

In general, pallets are loading aids, or load carriers, existing in different dimensions (Euro pallet, Düsseldorf pallet, etc.) and serving for bundling, storing, and transporting larger quantities of the articles 12. Pallets can be made of different materials (carton, wood, metal, etc.). In the furniture industry, pallets particularly long, or long pallets (2000×800×144 mm³), are often used.

The source pallets 30 can be stored—dependent on dimension—single deep or multiple deep (in the transverse direction Z) in storage locations 32 of the racks 24. Preferably, Euro pallets are used. Each storage location 32 represents a rack compartment configured for receiving one pallet. In a simple design, the rack compartments are defined by longitudinal beams, cross beams, and/or rack uprights of the rack 24. The rack compartments can be configured to receive different types of pallets. This means that source pallets 30 including different load carriers can be stored in the rack 24 at the same time.

In FIG. 1 each of the racks 24-1 and 24-2 exemplarily includes four storage levels arranged vertically, i.e. in the height direction Y, on top of each other. The storage locations 32 are arranged continuously in the longitudinal direction X next to each other and continuously in the height direction Y on top of each other. Each rack 24 comprises at least two levels, i.e. at least one level for the storing of the source pallets 30 (storage level) and at least one vertically spaced conveyor level for directly supplying the source pallets 30 along a shortest path to the picking zone 16. The storage levels comprise storage locations 32 only. The conveyor level comprises preferably conveyors only, and thus no storage locations 32, at least along or parallel to the picking zone 16.

It is understood that one single rack 24 can be sufficient for implementing the storage zone 14. In FIG. 1 this would be the rack 24-1 being adjacent directly to the picking zone 16. Also, the storage zone 14 can further comprise more than two racks 24.

The picking zone 16 is substantially defined by one or more gantry robots 36. A base area of the picking zone 16 substantially corresponds to a base area of the gantry robot(s) 36. Preferably, the conveyor level is as long as the picking zone 16. With other words, additional racks, or rack sections (not shown), may adjoin the rack 24-1 in the longitudinal direction X, which get by without any conveyor level, in particular in the positive direction X.

Further, it is understood that one or more additional picking zones 16 (not shown) may be provided. In particular, one additional picking zone 16 (not shown) can adjoin the rack 24-2, for example, in a mirror symmetrical manner. This additional picking zone may be reserved for orders that are collected directly by the customers, while the picking zone 16 at the rack 24-1 is reserved for shipping (or vice versa). The additional picking zone 16 at the rack 24-2 would not be as long as the one at the rack 24-1, because the lower rack level of the rack 24-2 is occupied by a supplying conveyor which supplies the second SRD 28 with source pallets (replenishment).

Source pallets 30 are (automatically) provided in the picking zone 16 by means of conveyors 38 (cf. also FIGS. 4 and 5) for depalletizing such of the articles 12 which are required for generating a stack of articles on a target pallet 34 (which is not shown in more detail here) in accordance with a packing pattern (and thus in accordance with the associated order). The target pallet 34 includes a load carrier (pallet) and the order-specifically required articles 12. In the following, it will not be accurately distinguished between the load carrier alone and the combination of load carrier and articles 12, because the target pallet 34 is empty at the beginning of a picking process, i.e. is only implemented by the pallet, and contains the order-specific articles 12 at the end.

Figure 6A:
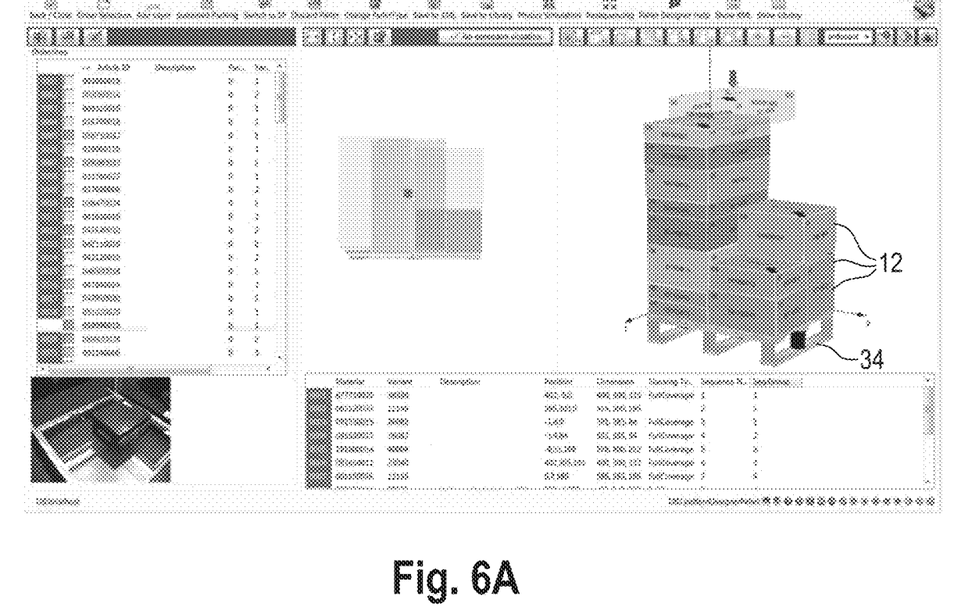

The forming of the (article) stack on the target pallet 34 is determined and given by a packing-pattern generator (planning software) in terms of the packing pattern for packing the articles 12 by means of one of the gantry robots 36 in an order-specific manner in—space-optimized as possible, stable, mutually supporting—layers as stack onto the associated target pallet 34. FIG. 6A shows a section of a graphical user interface (GUI) of the planning software, wherein a perspective view of the (planned) article stack on the target pallet 34 is visualized in the right column of FIG. 6A, wherein in the middle column of FIG. 6A a semi-transparent top view of the stack is visualized, and wherein in the left column of FIG. 6A a list of required article types (article ID) and quantities (order lines), as well as a photo of the currently processed article 12, are illustrated.

Figure 6B:
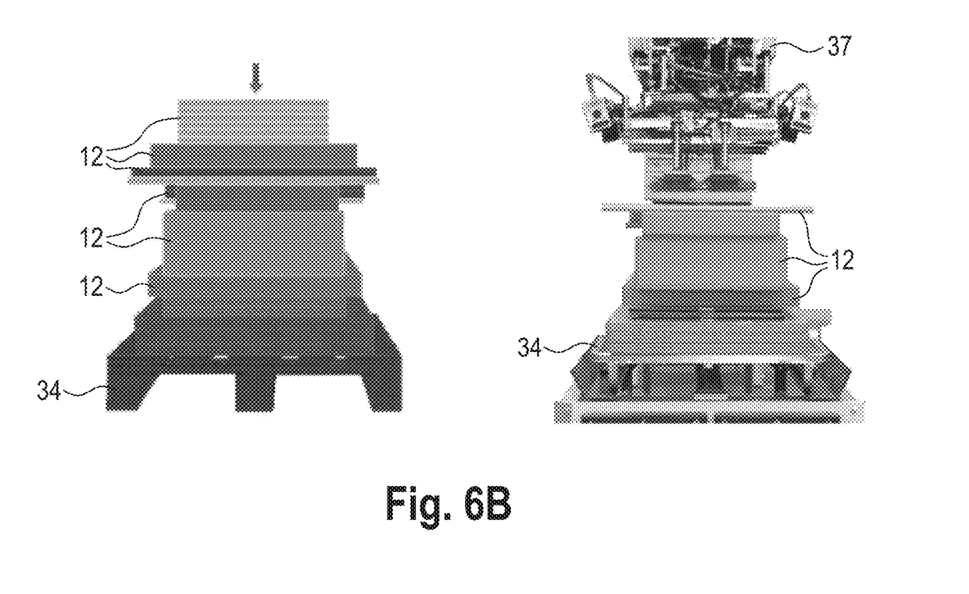

On the left in FIG. 6B, a completely packed target pallet as planned, and on the right as actually packed, is shown.

The "gantry robots 36" are (industrial) robots coupled to a gantry-like frame (gantry frame) for moving manipulation units 37 (end effectors) thereof in a respective rectangular operational space, which is spanned by three translatory (Cartesian) movement axes (XYZ) of the respective robot. In general, robots are universally applicable motion machines with several translatory and/or rotatory axes. The movements of the robots with respect to movement sequencies and movement paths are freely programmable and, if necessary, sensor-guided. The robots are equipped with the manipulation units 37 (preferably vacuum lifters adhering, by means of vacuum, to a top side of the articles and then lifting, moving, and then putting down the articles) and can perform handling tasks (transferring an article from a source pallet 30 on a target pallet 34).

Figure 2A:
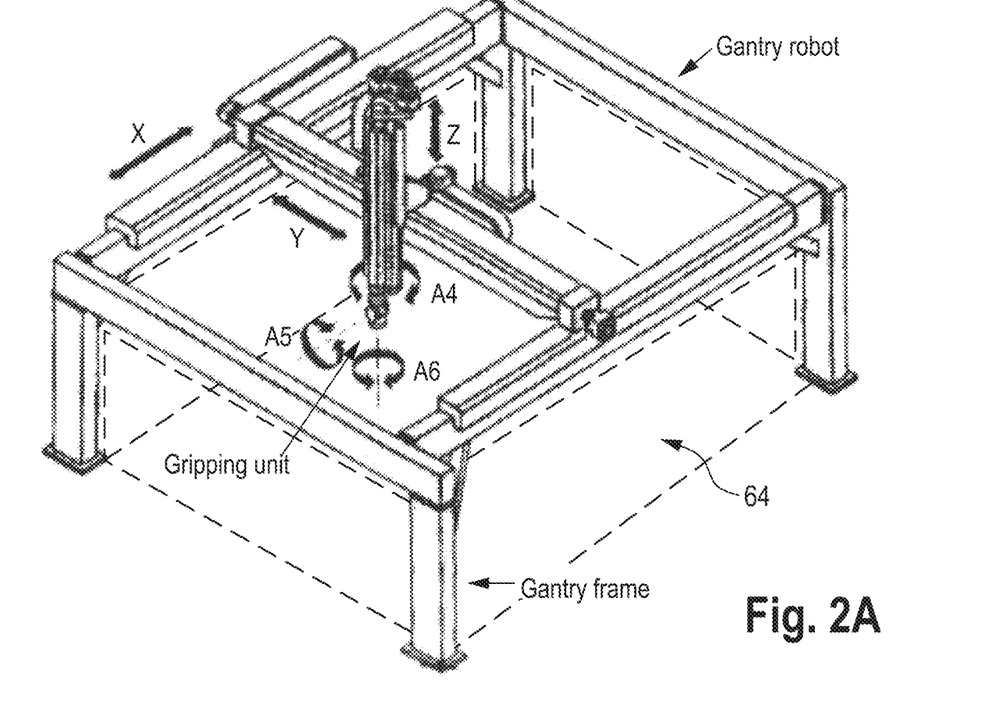

FIG. 2A schematically illustrated one single gantry robot 36 comprising one stationary (gantry) frame including, for example, four stationary vertical supports, two stationary longitudinal beams and two stationary transverse, or cross, beams, on which a transverse beam movable (in X) is supported, to which a vertically movable (in Y) mast is coupled. The mast is coupled to a carriage on the cross beam. The three translatory main axes (A1-A3, not shown) are designated by X (longitudinal direction), Z (transverse direction), and Y (vertical direction). FIG. 2A further indicates three (optional) rotational axes A4-A6 for the gripping unit, or the manipulation unit, 37. The carriages for the movable cross beam and the mast are typically driven by electric motors, wherein transmission of force is implemented by, for example, toothed belts, toothed racks, gear racks, or spindles. Alternatively, linear-motor direct drives, pneumatic drives, or other drives can be used.

FIG. 2A shows a full gantry. However, half gantries could also be used which stand on two vertical supports only, which could also (optionally) be mounted movably on the floor. The full gantry of FIG. 2A is also referred to as an area gantry because a large horizontal (base) area is covered.

Figure 2B:
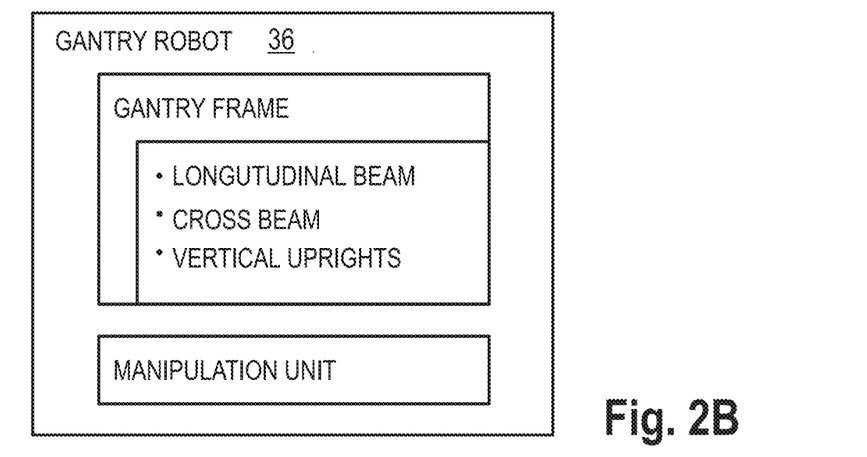

FIG. 2B shows a block diagram of the gantry robot 36.

The gantry robot 36 of FIG. 2B generally comprises the gantry frame, preferably arranged stationary, and at least one manipulation unit 37. The manipulation unit 37, which is preferably implemented as suction gripper, is movably coupled to the gantry frame. The manipulation unit 37 is automatically movable along at least two axes. The gantry frame projects vertically above the conveyors 38 (cf. FIGS. 4 and 5), so that the articles 12 can be received, from above by means of the manipulation unit 37, from the source pallets 30 including the (storage) articles 12 and the pallet-like load carrier, and can be delivered downwards to the target pallet(s) 34.

The gantry robot 36 are used also for depalletizing, or separating, source pallets 30 and for palletizing, or layerwise stack formation, on the target pallets 34 in the picking zone 16, as will be explained in more detail below.

The source pallets 30 are loaded, preferably in a type-pure manner, i.e. always one single article type only—in any quantity of one or more—is stored on the source pallets 30.

Figure 3:
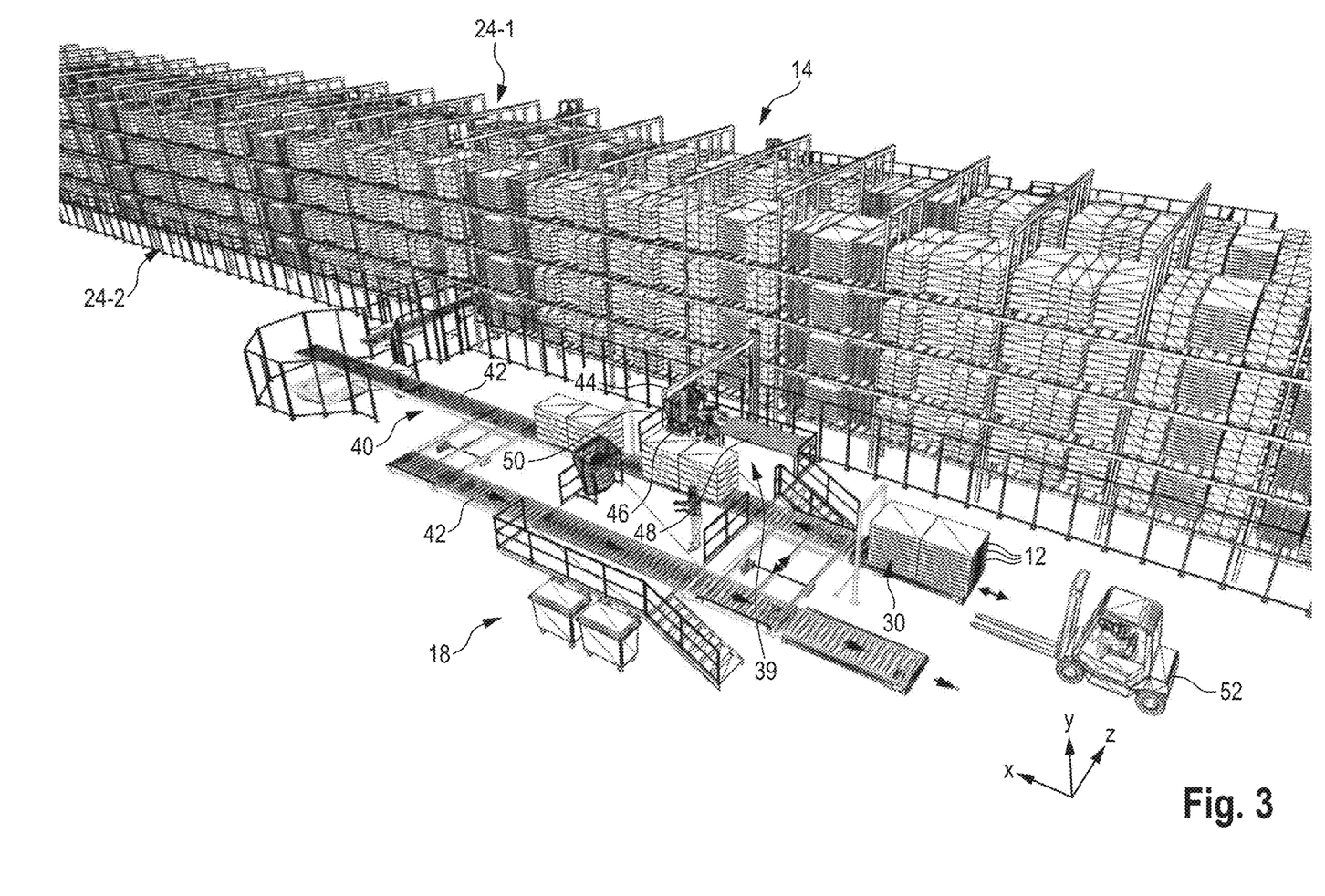
FIG. 3 shows a detailed view of an incoming-goods zone of the picking system of FIG. 1.

In the incoming-goods zone 18 of FIG. 1, which is illustrated in more detail in FIG. 3, the system 10, and in particular the storage zone 14, is fed with (incoming-goods) articles 12 in terms of replenishment from the outside, and checked and prepared (removal of transport securing, identification and counting of articles 12, quality inspection, etc.) for storage into the racks 24. In FIG. 3 the racks 24 of the storage zone 14 of FIG. 1 are viewed from behind (cf. arrow III in FIG. 1).

The incoming-goods zone 18 can include one or more so-called teach-in stations 39, where, for example, (outer) dimensions of incoming-goods source pallets 30 and of the associated individual articles 12, identifying codes of the source pallets 30 and of the articles 12 stored thereon, quantity of the articles 12, and the like are acquired, preferably automatically.

In general, the incoming-goods zone 18 is coupled via a conveying system 40, preferably via continuous conveyors (such as chain conveyors, roller conveyors 42, belt conveyors, electric overhead conveyors, electric floor conveyors) to the storage zone 14. In FIG. 3 the conveying system 40 exemplarily enters, in a central area of the storage zone 14, from behind into the rear rack 24-2, in order to be reachable by both (not shown) SRD 28 equally quick, which conduct the storing of the incoming-goods source pallets into the racks 24.

Alternatively, or additionally, the conveying system 40 may extend to one or both end faces of the racks 24, and/or parallel to the direction X, at least partially within one, or within both, of the racks 24 for supplying the SRD 28 with new loaded source pallets 30 and for disposing old empty pallets (cf. arrows illustrating a conveying direction in FIG. 3).

The teach-in station 39 can optionally further comprise a swivel arm 44 with a vacuum lifter 46, a roller table 48 for disposing and manually checking separated articles 12, a scale, a light curtain 50, and/or the like, in order to determine the required data for each incoming-goods pallet, in order to qualify and handle the incoming-goods pallet as a source pallet 30.

In FIG. 1 completely stacked, or packed, target pallets 34, i.e. target pallets 34 containing all of the articles 12 given in accordance with an order in the stack given by the corresponding packing pattern, are prepared for shipping in the shipping zone 20 by, for example, wrapping (circumferentially) the flat-pack articles 12 stacked onto the target pallet 34 with a film for transport protection, by sticking on shipping data, and the like (not shown). Completed target pallets 34 can also be buffered in the shipping zone 20 until they finally leave the system 10.

Alternatively or additionally, completed target pallets 34 can also be prepared for direct handover to the end customer, for example, when the system 10 is connected directly to a sales outlet (store), where the end customers can view sales items in an assembled state in a separately provided showroom, and can then order and take away the same as flat-packs, in order to assemble the items themselves at home.

The target-pallet buffers 22 in FIG. 1 serve for replenishment of empty target pallets 34 which are transported preferably by means of discontinuous conveyors (such as unmanned forklift trucks 52, driverless transport vehicles, and the like) within or to the picking zone 16, in order to be loaded there with the associated articles 12 by the gantry robot(s) 36 in accordance with the order-specific packing pattern.

Figure 4A:
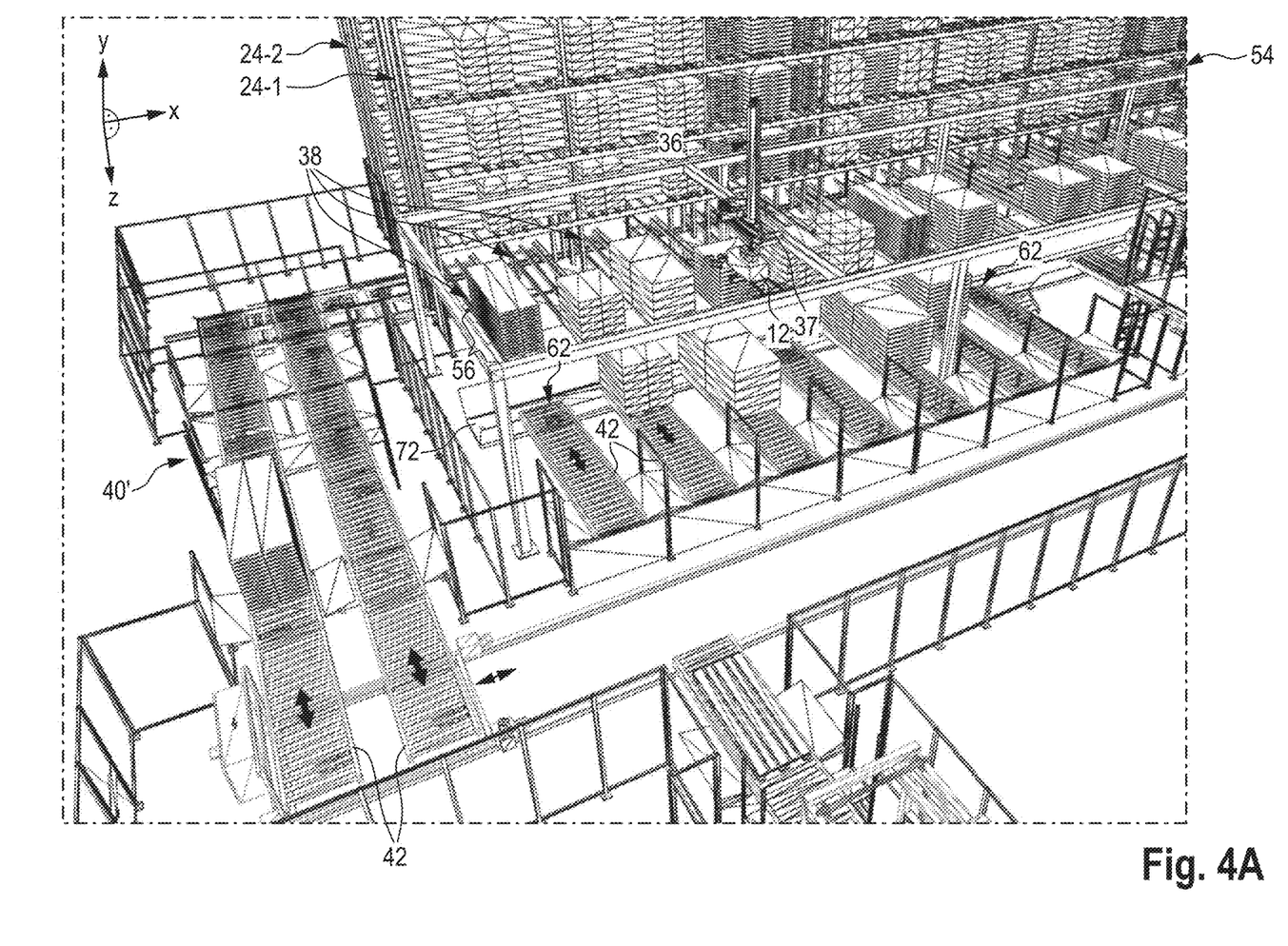
FIGS. 4A and 4B show a further detailed view of the picking system of FIG. 1.
Figure 4B:
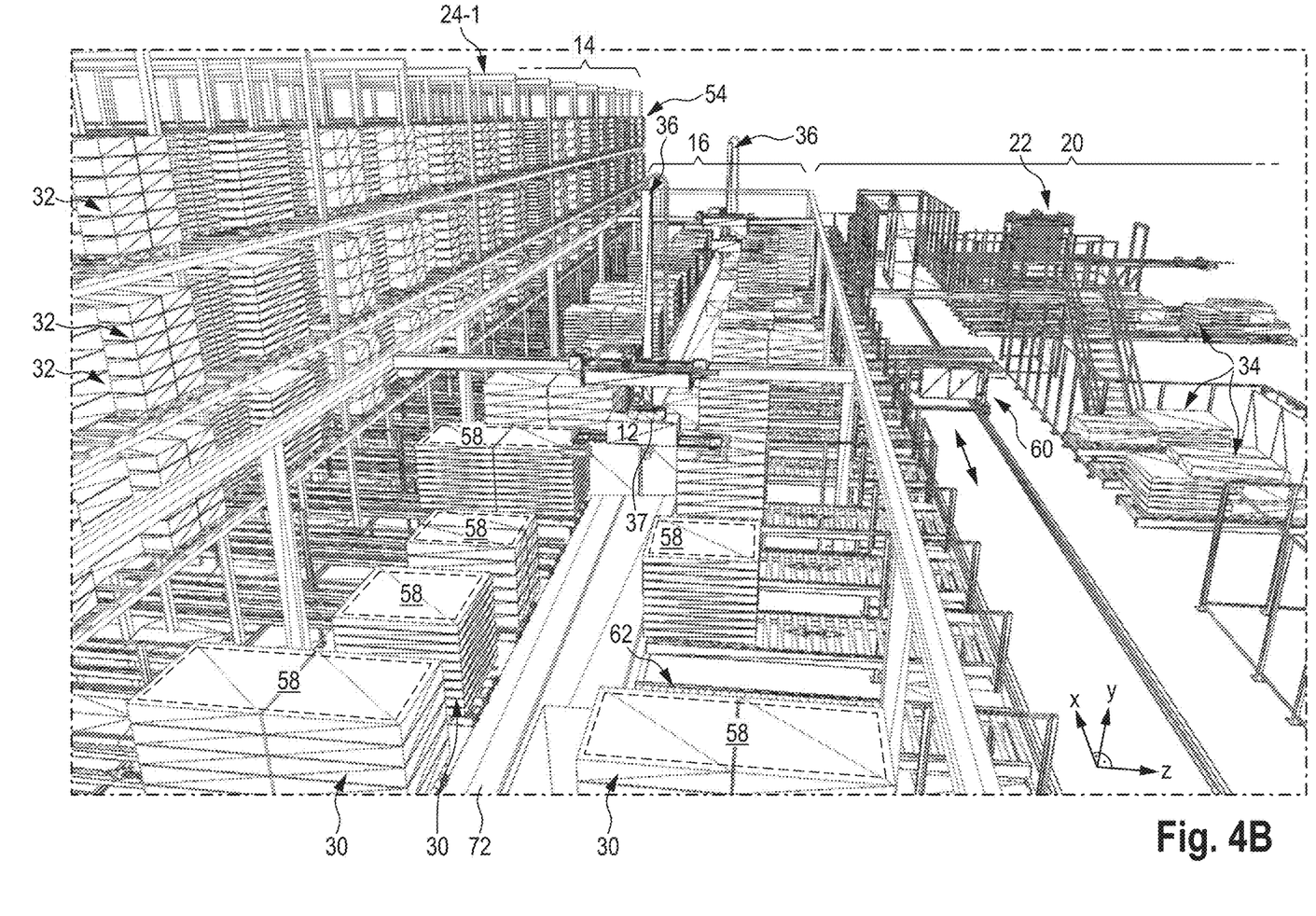

FIG. 4 shows a perspective detail view (FIGS. 4A and 4B) of the system 10 of FIG. 1 along the arrows IV-A and IV-B in FIG. 1. FIG. 4 in particular shows a view into the picking zone 16 where the gantry robots 36 are arranged in the longitudinal direction X (directly) one after the other and parallel to an outer longitudinal side 54 of the first rack 24-1 (cf. FIG. 1). The gantry robots 36 and the picking zone 16 are directly adjacent, in the transverse direction Z, to the storage zone 14. The gantry robots 36 are, substantially directly, adjacent in the transverse direction Z, i.e. directly, to the rack 24-1, and are connected in terms of material flow (source pallets 30) via the conveyors 38 directly to the storage zone 14, in particular to the first rack 24-1.

In FIG. 4 a plurality of conveyors 38 is shown, which are exemplarily implemented as chain conveyors. Preferably, the conveyors 38 are linear continuous conveyors, which are arranged in particular parallel and (minimally) spaced apart from each other and which extend substantially in the transverse direction Z. The conveyors 38 are configured to (automatically) transport the source pallets 30 from the area of the rack 24-1 along a shortest way into the picking zone 16, i.e. into the action space of the gantry robot 36.

The conveyors 38 are arranged at the lowest level of the rack 24-1. Preferably, the lowest level of the rack 24-1 is provided exclusively with the conveyors 38, at least along the picking zone 16, i.e. along the gantry robot 36. Further, this means that at the lowest level of the rack 24-1 along this rack section no storage locations 32 are provided. This conveyor level is a transfer level, or transfer zone, between the storage zone 14 and the picking zone 16.

It is understood that this transfer zone can also be provided at a central or uppermost level of the rack 24. The embodiment of FIG. 4 illustrates a floor-based configuration where the picking and shipping occurs on the (building) floor. It is understood that the picking and/or the shipping can also occur at a different floor of the building (not illustrated), in which the system 10 is installed. The rack 24 extends over several stories, and is coupled horizontally via the conveyors 38 to the picking zone 16.

FIG. 4 further illustrates that—when viewed in the longitudinal direction X—two conveyors 38 are provided for every three storage locations 32. With other words, instead of two directly adjacent conveyors 38 three directly adjacent storage locations 32 within the racks 24 (between two adjacent vertical rack uprights) may be provided. Alternatively, a ratio of 2:1 may be selected for the ratio between the storage locations 32 and the conveyors 38.

Since the conveyors 38 supply the gantry robots 36 with source pallets 30, which are required for an order-specific picking, it is preferred to provide as many as possible conveyors 38 per section of length of the rack 24. The number of the conveyors 38 is a measure for the throughput, i.e. the capability of quickly delivering different articles 12 (in accordance with the picking order) to the gantry robots 36.

The source pallets 30, which are positioned in the left half of the action spaces of the gantry robots 36 of FIG. 4, stand on end portions 56 of the conveyors 38, which define the so-called delivering positions 58 (cf. FIG. 4B) for the articles 12 within the action spaces of the gantry robots 36. The source pallet 30, which is shown in the lower left of FIG. 4B, contains, for example, ten flat-pack articles 12 stacked in two stacks of respectively five pieces on top of each other.

The source pallets 30 generally represent the removal sources for the picking process. The target pallets 34 at the packing positions 62 generally represent the delivery targets for the picking process.

The delivering positions 58, which are shown in the left half of the action spaces of the gantry robots 36 in FIG. 4B, preferably represent "dynamic" delivering positions. The dynamic delivering positions 58 are characterized in that the source pallets 30 can be moved bidirectionally by the conveyors 38. This means that the source pallets 30 are moved to the delivering positions 58 for removal, i.e. depalletization by the gantry robot 36, in order to be moved back again subsequently—after the removal of the required articles 12—into the storage zone 14 and into the rack 24, respectively.

"Static" delivering positions 58 are characterized in that all articles 12 are consumed before the load carrier of the associated source pallet 30 is disposed. In FIG. 4B, for example, each of the delivering positions 58, which are arranged in the longitudinal direction X adjacent to the packing positions 62 and which are in the right half of the action spaces of the gantry robot 36, is implemented as "stationary" delivering position. The packing positions 62 are formed, for example, by end portions of, for example, roller conveyors 42 (cf. FIG. 4A) connecting the picking zone 14 to the shipping zone 20. It is understood that the packing positions 62, which are configured for providing the target pallets 34, can also be supplied with the target pallets 34 by discontinuous conveyors, such as the forklift trucks 52. The target pallets 34 may also be placed directly, for example on the hall floor for defining the packing positions 62.

The supply of the stationary delivering positions 58 with the source pallets 30 (of the access-frequency type A) can be implemented, for example, via a transfer carriage 60 which can travel rail-guided in the longitudinal direction X, in order to deliver the source pallets 30 in the transverse direction Z then. The transfer carriage 60 also is an discontinuous conveyors which can be coupled via a further conveying system 40' to the (incoming) conveying system 40 (cf. FIG. 3) and/or within the area of the face end of the racks 24 to the SRD 28, in order to transport the source pallets 30 from the storage zone 14 to the static delivering positions 58. Completely emptied source pallets 30, i.e. load carriers thereof, can be disposed with the transfer carriage 60 and replaced with new source pallets 30.

The material-flow connection of the stationary delivering positions 58, or such positions 58 not being realized by the conveyors 38, is preferably implemented by—or under consideration of already existing—conveying systems, such as the conveying system 40 of the incoming-goods zone 18 or also the forklift trucks 52. It is understood that the further (not shown) conveying systems (e.g. driverless transport vehicles, overhead conveyors, etc.) may be used.

The transfer carriage 60 can be used further for transporting empty target pallets 34—via, for example, the roller conveyors 42—into the action spaces of the gantry robots 36. In this case, the empty target pallets 34 are positioned in a packing position 62 within the action spaces of the gantry robots 36. In FIG. 4B the packing positions 62 are shown in the right half of the action space.

The supply of the (dynamic) delivering positions 58 with source pallets 30 from the storage zone 14 takes place directly and along shortest ways. The supply is preferably fully automatic upon integration of the SRD(s) 28 operated along a longitudinal side of the rack 24-1 facing way from the picking zone 16. This longitudinal side (68 in FIG. 5) is opposite, in the direction Z, to the longitudinal side 54 shown in FIG. 4.

The transfer carriage 60 is an exemplary implementation of the connection, in terms of conveyance, of the right half of the action spaces, which may also be performed by different conveyor types (continuous conveyors or discontinuous conveyors), as mentioned above.

Figure 5:
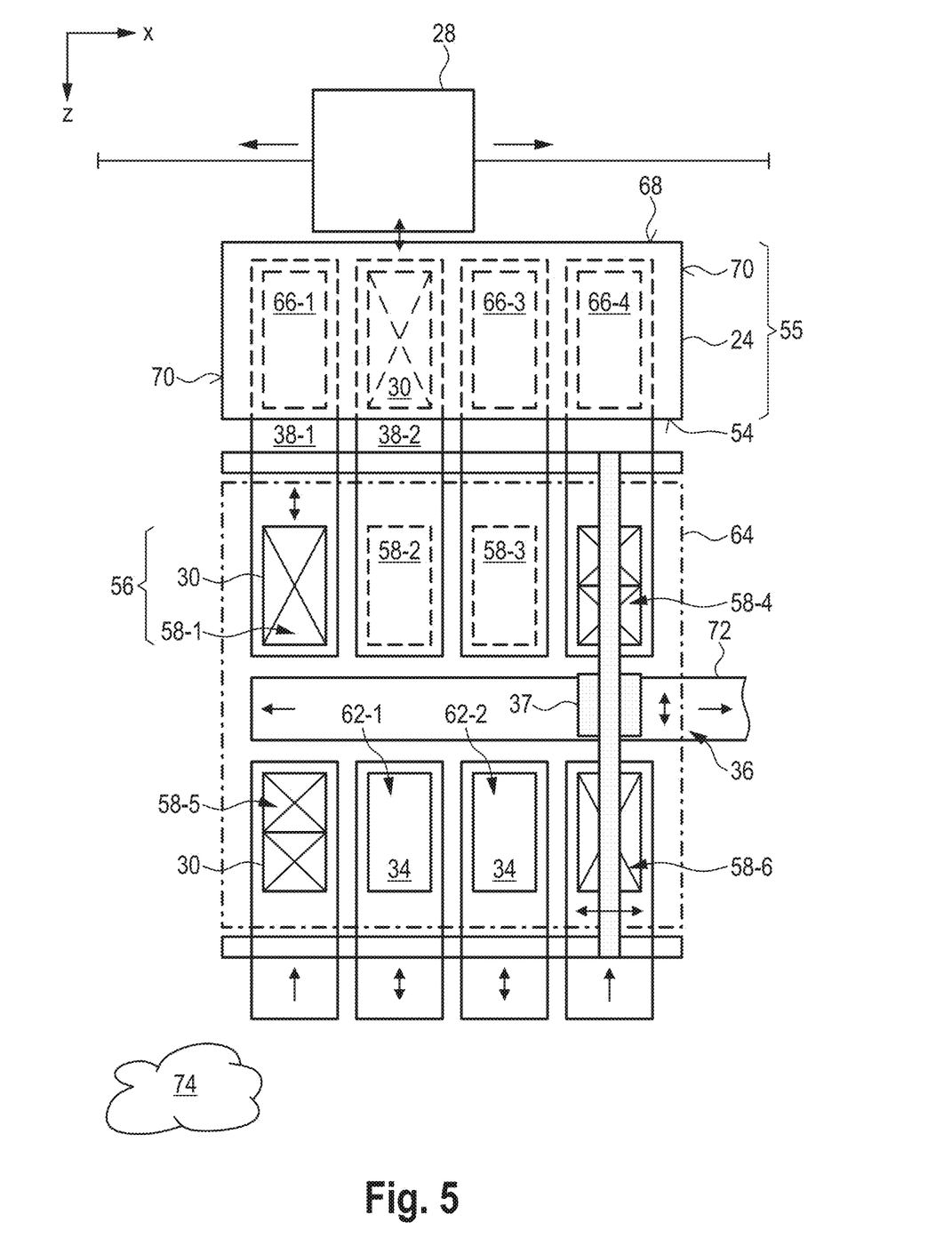
FIG. 5 shows a schematic top view of a second embodiment of the picking system.

FIG. 5 shows a top view of a schematically illustrated second embodiment of the system 10 which only differs insignificantly from the system 10 in FIGS. 1-4.

The system 10 of FIG. 5 exemplarily includes one (single) rack 24 for buffering the source pallets 30 at multiple levels, and exemplarily one (single) gantry robot 36, as well as exemplarily four conveyors 38 connecting, in terms of material flow, the rack 24 to the action space of the gantry robot 36, base area of which is outlined in FIG. 5 by a dash-dotted line 64. Also, more or less conveyors 38 may be provided.

Again, the conveyors 38 start within the rack 24, and again terminate within the action space of the gantry robot 36. First end portions 55 of the conveyor 38, which are within the rack 24, define the receiving positions 66, and the second opposite end portions 56 of the conveyors define the delivering positions 58 again. The conveyors 38 are again operated preferably bidirectionally. Thus, respectively four receiving positions 66-1 to 66-4 and four delivering positions 58-1 to 58-4 are shown, which are assigned to the four conveyors 38-1 to 38-4.

The source pallets 30, which originate from the storage locations 32 (not shown) of the rack 24, are received on the receiving positions 66. The source pallets 30 are retrieved from a longitudinal side 68, facing away from the gantry robot 24, of the rack 24 and are moved into the receiving locations 66. The retrieval from the storage locations 32 and the delivery to, or the storage in, the receiving positions 66 takes place, preferably automatically through the SRD 28.

Preferably, the conveyors 38 of FIG. 5 are linear continuous conveyors but may also generally be implemented by discontinuous conveyors (e.g., driverless transport vehicles, AGV). In particular, the conveyors 38 are generally provided separately to each other.

Length of the conveyors 38 (in the transverse direction Z) is selected as short as possible so that little time is needed for transport of the source pallets 30 between the respective receiving position 66 and the respective delivering position 58, so that more source pallets 30 can be served to the gantry robot 36 per unit of time (throughput/performance). The conveyors 38 automatically move the source pallets 30 from the receiving positions 66 into the corresponding delivering positions 58, where the articles 12 (not illustrated) are delivered to the gantry robot 36 for picking. The gantry robot 36 moves its cross beam in the longitudinal direction X to the corresponding delivering position 58, moves the manipulation unit 37, by means of the carriage, in the transverse direction Z directly above the desired articles 12, lowers the manipulation unit 37, grabs the (single) articles 12, lifts the same vertically, and moves the manipulation unit 37 in the longitudinal and transversal directions to the packing position 62, where the associated target pallet 34 is buffered, in order to vertically set down the articles 12 there at the position, which is given by the packing pattern, and in the corresponding orientation.

Thus, the transport time of the source pallets 30 is substantially determined by a distance between the rack 24 and the gantry robot 36. Thus, the gantry robot 36 is preferably arranged directly adjacent to the rack 24 in the direction Z. The gantry robot 36 is directly adjacent to the longitudinal side 54 of the rack 24 facing the gantry robot 36.

The gantry robot 36 can also be supported on the rack 24. Parts of the gantry frame can be implemented, for example, by the rack construction. However, in FIG. 5, the gantry frame is provided separately to the rack construction.

The perpendicular orientation and uniform distribution of the conveyors 38 over the longitudinal side 54 of the rack increases the number of the delivering positions 58 within the action space of the gantry robot 36. This means that more differently loaded source pallets 39 can be provided to the gantry robot 36 at the same time for picking. In this manner, the picking time can also be reduced. The gantry robot 36 does not need to wait for the provision of additional source pallets 30, which are required for the processing of an order.

In addition, a large number of delivering positions 58 increases the possibility for a sequenced provision of the source pallets 30. The order-specific packing patterns require the provision of the articles 12 in a pre-determined order. Heavy and/or bulky articles 12 are preferably arranged in a lower part of the packing pattern, while light and/or little articles 12 are preferably positioned in an upper part of the articles stack which is to be formed on the target pallet 34. The sequence of the provision of the corresponding source pallets 30 at the delivering positions 58 is also relevant.

The conveyors 38 could also exit from the end faces 70 of the rack 24. In this case, however, only one single receiving position 66 within the rack 24 would be available, thereby decreasing the throughput. This one receiving position 66 would be a "bottle neck" to the SRD 28, because no source pallets 30 can be preliminary parked there, as it is the case, however, in the arrangement of FIG. 5. In addition, course of the conveyors 38 from the rack 24 to the gantry robot 36 would be complex, since switches and intersections would need to be used for ending in a corresponding number of delivering positions 58, as shown in FIG. 5.

For example, two packing positions 62-1 and 62-2 are shown in FIG. 5, which may comprise a table-like frame and optionally also conveying means for providing the empty target pallets 34 at predetermined locations, which match with the packing position 62.

While the gantry robot 36 moves the article 12 towards the target pallet 34, the source pallet 30 can already be moved back into the rack 24 again by moving the source pallet 30 into the receiving position 66, which is picked up there by the SRD 28 and transferred to the old (or alternatively a new) storage location 32.

In FIG. 5 the corresponding movements are indicated by arrows.

The delivering positions 58-1 to 58-4 are operated dynamically, wherein preferably articles 12 of the access frequencies B and C are served. The delivering positions 58-5 and 58-6, which are arranged in the longitudinal direction X externally adjacent to the packing positions 62-1 and 62-2, are operated statically. This means that the source pallets 30 stay there until all of the articles 12 have been removed and these source pallets 30 are "empty". These source pallets 30 are not stored back into the rack 12. The source pallets 30 on static delivering positions contain preferably articles 12 of the access frequency A.

On the side of the (dynamic) delivering positions 58-1 to 58-4 preferably no packing positions 62 are arranged for the above-mentioned reasons. The packing position(s) 62 are preferably arranged (in the transverse direction Z) oppositely to the delivering positions 58-1 to 58-4.

In FIG. 5 the delivering positions 58-1 to 58-4 are spaced away in the transverse direction Z from the packing positions 62 for receiving an (optionally provided) discharging conveyor 72 which can be used for removing intermediate layers (e.g., cartons), which are used between layers of articles on the source pallets 30, from the action space. The discharging conveyor 70 can also be used for removing empty pallets, for example, with the manipulation unit 37, which have emptied on the static delivering positions 58-5 and 58-6, in order to create space for new source pallets 30.

It is understood that the positions 58-1 to 58-4 can also be arranged without distance in the direction Z relative to the positions 58-5, 58-6, 62-1 and 62-2 for keeping the picking zone 16 small (reduced area requirement).

The dynamic delivering positions 58-1 to 58-4 are positioned in the arrangement of FIG. 5 preferably "above" the conveyor 72, and the static delivering positions 58-5 and 58-6, as well as the packing positions 62-1 and 62-2, are preferably "beneath" the conveyor 72. This is advantageous in that the material flows of the delivering positions 58 and the packing positions 62 do not mix at all, or only a little, resulting in an increased throughput.

It is understood that in FIG. 5 more or less packing positions 62 can be used than shown. Further, it is understood that the delivering positions 58-1 to 58-4 can also be operated statically, and/or the delivering positions 58-5 and 58-6 can also be operated dynamically. The delivering positions 58-5 and 58-6 can also be omitted, or be replaced with additional packing positions 62. The base area of the action space, in particular a length thereof in the direction X, can be extended or shortened for defining more or less positions 58 and/or 62.

In general, each system 10 further comprises a control 74, which controls the material flow and which is preferably configured further to determine the packing pattern. For this purpose, the control evaluates the orders and/or the packing pattern, and generates corresponding transport orders for causing the required movements of the source pallets 30 and the target pallets 34 by using the conveying system (e.g., SRD 28, conveyors 38, roller conveyor 42, forklift trucks 52, transfer carriages 60, etc.).

It is understood that the pending software for the packing pattern can also be executed on a computer being provided separately to the control 74. In this case, the control 74 determines the source pallets 30 required for the stack from the data achieved by the planning software, preferably via an article identifier.

FIG. 5 also illustrates a "picking cell" formed by a portion of the rack 24 and the associated gantry robot 36, and the action space thereof, which is arranged directly opposite to the rack portion and is directly connected to the rack 24 via several of the conveyors 38 which tunnel through the rack 24 and the corresponding portion of the rack 24, respectively.

It is understood that several of these picking cells can be arranged directly adjacent, or also spaced apart, along one or both longitudinal sides of the rack 24.

Further, it is understood that in general each of the gantry robots 36 defines a separate action space, which is typically limited by the gantry frame. If several gantry robots 36 are arranged directly adjacent to each other, they can share one (single) gantry frame. In this case each of the gantry robot 36 is substantially characterized by its manipulation unit 37 and the associated cross beam, which is movable on the gantry frame in the direction X. The movements can take place in an overlapping manner, i.e. certain areas of the (common) gantry frames can be reached by several cross beams (temporarily displaced). This means that the action spaces can overlap. In this case, the boundaries of the action spaces are not rigid, as usual otherwise, but dynamic.

Figure 7:
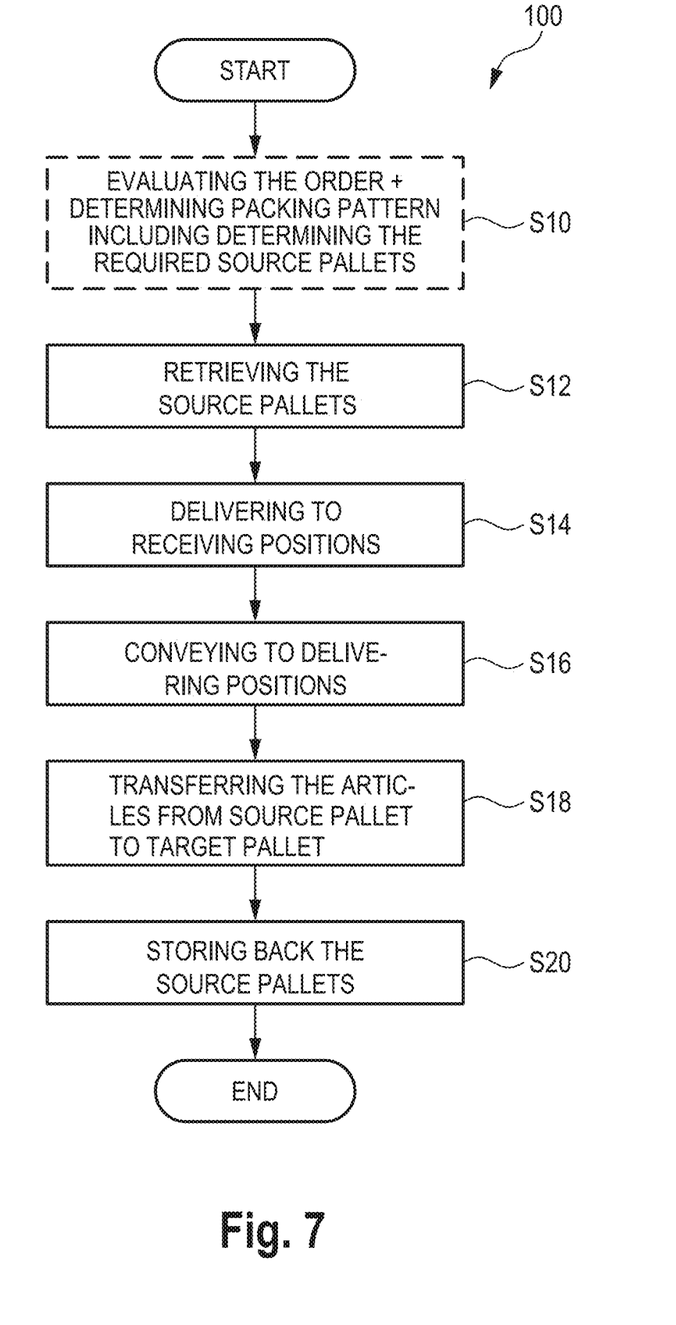
FIG. 7 shows a flow chart of a picking method.

FIG. 7 shows a flow chart of a method 100 for picking the articles 12 in accordance with picking orders.

In a first optional step S10, the order is evaluated by means of the control 74 and/or the separate computer for determining the packing pattern as well as the source pallets 30 required for this purpose.

In step S12 the corresponding source pallets 30 are retrieved, as described above.

In step S14 the retrieved source pallets 30 are transferred to the receiving positions 66, as described above.

In step S16 the delivered source pallets 30 are conveyed to the corresponding receiving positions 58 by means of the conveyors 38.

In step S18 the articles 12 are transferred, by means of the gantry robot 36, from the source pallets 30 on the target pallet 34. The step of transferring S18 includes the receiving of the articles 12 from the source pallets 30 at the receiving positions 58, the moving of the received articles 12 to a position, given by the packing pattern, on the target pallet 34, as well as, if necessary, in a corresponding orientation of the article 12 in advance, and packing the received article 12 on the target pallet in accordance with the packing pattern.

In an optional step S20 the source pallets 30 are stored back, which have not been emptied during the proceeding picking. These source pallets 30 sit on the above-mentioned dynamic receiving positions 58.

Subsequently, completed target pallets 34 can be transported into the shipping zone 20 (not illustrated).

After that, the method 100 ends.

LIST OF REFERENCE NUMERALS 10 picking system
12 (flat-pack) article
14 storage zone
16 picking zone
18 incoming-goods zone
20 shipping zone
22 target-pallet buffer
24 rack
26 rack aisle
28 storage and retrieval device
30 source pallet
32 storage location
34 target pallet
36 gantry robot
38 conveyor
39 track-in station
40, 40' conveying system
42 roller conveyor
44 swivel arm
46 vacuum lifter
48 roller table
50 light curtain
52 forklift trucks
54 longitudinal side
55, 56 end portion of 38
58 delivering position
60 transfer carriage
62 packing position
64 action space
66 receiving position
68 longitudinal side of 24
70 face end of 24
72 discharging conveyor

The invention claimed is:

1. A system configured to pick articles in accordance with picking orders comprising:
    a rack extending along longitudinal and height directions of the system and comprising a plurality of storage locations configured to store source pallets;
    a gantry robot including a manipulation unit configured to transfer the articles;
    a packing position configured to buffer a target pallet;
    a plurality of conveyors; and
    a control;
    wherein, for each of the orders, an order-specific packing pattern is determined for automatically packing, by the gantry robot, several of the articles in accordance with the respective order from one or more of the source pallets on a target pallet in the packing position;
    wherein each of the conveyors comprises a receiving position, which is positioned within the rack and configured to receive the source pallets, as well as a delivering position, which is positioned within an action space of the gantry robot and configured to provide the source pallets;
    wherein the gantry robot defines the action space, within which the manipulation unit is movable and which contains the packing position and the delivering positions of the conveyors; and
    wherein the control is configured to cause that such of the source pallets are transported from the storage locations of the conveyors via the receiving positions to the delivering positions of the conveyors, which include the articles required for the packing in accordance with the respective order-specific packing pattern.

2. The system of claim 1, wherein the articles are flat-pack articles.

3. The system of claim 1, wherein the delivering position is configured for dynamic provision of the source pallets.

4. The system of claim 1, wherein the gantry robot is directly adjacent to a longitudinal side of the rack.

5. The system of claim 1, wherein the conveyors are linear continuous conveyors, which:
    are operable bidirectionally,
    oriented perpendicular, preferably horizontal perpendicular, relative to the longitudinal direction, and
    comprise the receiving positions and the delivering positions at ends thereof.

6. The system of claim 1, further comprising at least one storage and retrieval device configured to automatically exchange the source pallets between the storage locations and the receiving locations, and are adjacent to a longitudinal side of the rack facing away from the gantry robot.

7. The system of claim 1, further comprising further delivering positions, which are also positioned within the action space and configured to statically provide the source pallets.

8. The system of claim 7, wherein at least some of the further delivering positions are coupled to a supplying conveyor, which is different to the conveyors.

9. The system of claim 8, wherein all of the further delivering positions are coupled to the supplying conveyor.

10. The system of claim 8, wherein the supplying conveyor includes a transfer carriage.

11. The system of claim 1, further including a discharging conveyor.

12. The system of claim 11, wherein the discharging conveyor extends parallel to the longitudinal direction and centrally through the action space.

13. The system of claim 1, wherein the conveyors are arranged on a floor level of the system.

14. The system of claim 1, wherein one level of the rack is exclusively provided with the conveyors.

15. The system of claim 14, wherein several of the gantry robots are arranged directly adjacent to each other in the longitudinal direction, wherein at least one separate packing position is provided for each of the gantry robots.

16. The system of claim 1, wherein a ratio between a number of conveyors and a number of the storage locations along the longitudinal direction is 1:2 or 2:3.

17. The system of claim 1, wherein the gantry robot is configured to depalletize the source pallets and to palletize the target pallets within the action space.

18. The system of claim 2, wherein each of the flat-pack articles:
- is rectangular plate-shaped;
- has outer dimensions in a range of 620×300×7 $mm^3$ to 2550×800×200 $mm^3$;
- weighs 62 kg at maximum; and/or
- contains stacked individual parts of a piece of furniture being ready-to-assemble.

19. A method for picking articles in accordance with picking orders comprising:
retrieving source pallets, which store the articles required for packing on a target pallet in accordance with an order-specific packing pattern, from storage locations of a rack in accordance with the order-specific packing pattern;
delivering the retrieved source pallets to receiving positions of conveyors, wherein the receiving positions are arranged within the rack, wherein the conveyors extend from the rack to a gantry robot arranged along a longitudinal side of the rack laterally adjacent to the rack;
transporting, by the conveyors, the delivered source pallets from the receiving positions to corresponding delivering positions of the conveyors, which are positioned within an action space of the gantry robot; and
transferring the articles, which are required for the packing on the target pallet in accordance with the packing pattern, by a manipulation unit of the gantry robot, wherein the target pallet is provided at a packing position within the action space of the gantry robot.

20. The method of claim 19, wherein the transferring of the articles comprises:
receiving the articles from the source pallets at the delivering positions;
moving the received articles to a position on the target pallet given by the respective order-specific packing pattern; and
packing the received articles on the target pallet in accordance with the respective order-specific packing pattern.

21. The method of claim 19, further comprising:
determining, by a control or a computer, the respective order-specific packing pattern for each order including the source pallets storing such of the articles, which are required for the packing on the target pallet in accordance with the respective order-specific packing pattern.

* * * * *